UNITED STATES PATENT OFFICE.

FERDINAND RITTER VON ARLT, OF VIENNA, AUSTRIA-HUNGARY, ASSIGNOR TO ACTIEN GESELLSCHAFT FÜR ANILIN FABRIKATION, OF BERLIN, GERMANY.

PHARMACEUTICAL PREPARATION.

991,261.

Specification of Letters Patent. Patented May 2, 1911.

No Drawing. Application filed October 31, 1910. Serial No. 590,000.

*To all whom it may concern:*

Be it known that I, FERDINAND RITTER VON ARLT, a subject of the Emperor of Austria-Hungary, residing at Vienna, Austria-Hungary, my post-office address being Mariahilferstrasse 93, Vienna, VI, have invented certain new and useful Improvements in Pharmaceutical Preparations, of which the following is a specification.

The citrate of copper as is well known has powerful bactericidal action and its use causes no trouble; thus for example trachoma is healed by this remedy in about 85 per cent. of the cases smoothly and without trouble for the patient. However, the small solubility of the preparation in water (1:9143), or in a common salt solution of 1 per cent. strength (1:7700), forms an objection. Thus the application of copper citrate as an eye-wash, which would be very desirable, appears excluded, and even the action of an ointment made by rubbing the preparation with glycerin ointment (5–10:100) does not possess the strength which is frequently desirable.

The general conclusion is that the sparing solubility of the preparation is the reason why it does not cause pain when applied in the form of an ointment. The solubility of copper citrate in water is indeed essentially increased by the addition of other salts, but if such a stronger solution be dropped into the eye lasting pain is produced.

Now according to my present invention the solubility of copper citrate in water can be very considerably increased in such a manner that the preparation produced does not cause pain to the user thereof and the means I use for this purpose consists in adding the necessary proportion of sodium-borocitrate to the copper citrate.

By the term sodium borocitrate I mean the sodium salt of the actual compound borocitric acid, $$C_3H_4BO(COOH)_3 + C_3H_4OH(COOH)_3,$$

as well as the ordinary borocitrate of commerce which is known to consist of mixtures of sodium borate and sodium citrate. The best solubility of the copper citrate is obtained when the proportion of neutral borocitrate used is such that there are 1 molecular proportion of the insoluble copper citrate and 2 molecular proportions of citric acid or 1 molecular proportion of sodium borocitrate respectively. For many purposes an addition of common salt is advantageous.

The following example may serve to illustrate my invention, the parts being by weight: In order to obtain my new pharmaceutical preparation in the solid state I may proceed as follows: 6.1 parts of crystallized copper citrate and 5.3 parts of sodium borocitrate

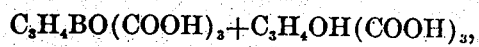

are dissolved together in water, whereupon the solution thus obtained is evaporated to dryness and the residue pulverized. Thus is obtained a light greenish blue to blue powder which easily dissolves in water to a greenish blue to blue solution which solution has proved suitable for use as a lotion in a series of infectious conjunctiva complaints or skin diseases. This aqueous solution assumes on the addition of a concentrated solution of ammonia in water a deep blue color and on the addition of a solution of sodium sulfid separates black flakes, whereas on the addition of soda lye the solution changes at first to deep blue and then on boiling separates a light green precipitate. The above mentioned powder resulting by evaporation of this aqueous solution is insoluble in alcohol, acetone, ether and methyl alcohol.

It is obvious that my present invention is not limited to the foregoing example or to the details given therein. Of course I may offer to the trade my new pharmaceutical preparation as a powder, made for instance according to the above-given example or as a lotion. Furthermore I do not confine myself to the proportions of the ingredients given in the above example. Finally it is also convenient to state that my new preparation can be prepared in the form of an ointment by incorporating the solid preparation into a suitable ointment base, such as glycerin ointment; it may be advantageous to add to the mass a small proportion of common salt.

Having thus described my invention and the manner in which it may be carried out what I claim is:—

A pharmaceutical preparation especially adapted for the treatment of trachoma and causing no pain to the patient, comprising copper citrate and sodium borocitrate which can be obtained by dissolving copper citrate and sodium borocitrate in water, evaporating the solution to dryness, this new preparation in the dry state pulverized being a light greenish blue to blue powder, easily soluble in water to a greenish blue to blue solution which solution on the addition of a concentrated solution of ammonia in water assumes a deep blue color and on the addition of a solution of sodium sulfid separates black flakes, whereas on the addition of soda-lye the solution changes at first to deep blue and then on boiling separates a light green precipitate, and which new preparation is insoluble in alcohol, acetone, ether and methyl alcohol.

In testimony whereof I have hereunto set my hand in presence of two subscribing witnesses.

FERDINAND RITTER VON ARLT.

Witnesses:
ADELAIDE FUNK,
ADA MARIA BERGER.